Patented Jan. 5, 1926.

1,568,339

UNITED STATES PATENT OFFICE.

JESSE H. LEFTWICH, OF CHICAGO, ILLINOIS.

ALIMENTARY PRODUCT AND PROCESS OF MAKING SAME.

No Drawing.  Application filed October 31, 1923.  Serial No. 671,880.

*To all whom it may concern:*

Be it known that I, JESSE H. LEFTWICH, a citizen of the United States, residing at Chicago, in the county of Cook and State of Illinois, have invented certain new and useful Improvements in Alimentary Products and Processes of Making Same, of which the following is a specification.

This invention relates to alimentary materials and has to do with a new product adapted particularly for use as a stock feed, or an ingredient in mixed feeds.

A general purpose of the invention is the provision of a material which may be produced economically in large quantities, which will have high food values as a stock feed, which will be agreeable to the animal's taste and easy of digestion and assimilation.

A more particular object of the invention is the provision of a material possessing the characteristics aforementioned and which will possess in addition desirable absorptive qualities rendering it of particular advantage in certain mixed feeds, such as dairy feeds.

Another object is the provision of a food material by which lime may be added to the ration in a form which is agreeable to the animal's taste and easily handled in its digestive and assimilative functions.

Another object is the provision of a method whereby a food product having the characteristics above mentioned may be manufactured or prepared.

Other and further objects of the invention will be pointed out hereinafter, indicated in the claims or obvious to one skilled in the art upon an understanding of the present disclosure.

The rapid increase in the practice of scientific feeding of animals for production of marketable meats, dairy products, etc., has occasioned a very great increase in demand for scientifically prepared feeds which may be used in connection with material which the feeder produces himself or has at hand, to give a properly balanced nutritious diet. Among the requirements necessary in such a feed are, that it be of proper merchantable form, that it be attractive to the animal and that it be economical. The subject matter of the presesnt invention is a new article of manufacture which possesses these attributes in a marked degree. I have discovered that by proper treatment of the plant known as the water hyacinth or Piaropus, whereby certain of the characteristics of the natural plant are materially changed, there may be produced a new article which satisfies not only these general requirements, but which possesses also certain further advantages peculiar to itself. The water hyacinth, of which there are various species, is an aquatic plant which grows in great profusion in both still and running water in the tropical, semi-tropical and warmer portions of the temperate zones. Heretofore it has not been put to any useful purpose, of which I am aware, but on the contrary, because of its rank and prolific growth, has become a pest in many places, due to its hindrance to navigation of various lakes an waterways. In its natural condition the plant has rather large coarse stems and leaves, which, however, are quite tender and easily bruised, and when crushed have a somewhat mucilaginous feel. In its natural growing state the plant contains over ninety percent water.

The production of my new food product from the plant in its natural condition involves compacting and desiccating operations, whereby the water content is reduced to a point at which the material will keep, and the physical characteristics of the material are decidedly changed. As a preferred method of procedure I subject the plants, just as they are harvested from their growing places, to high mechanical pressure in suitable rolls, or presses, in such fashion as to compress the loose and spongy structure of the plant and express a very considerable proportion of the water. By this operation the tender plants are compacted and the water content reduced to seventy percent or below. As an alternative procedure, the plants may be ground, and drained over sieves; or they may be ground and then subjected to the pressing operation. After removal of the proportion of water which can thus be expressed, the material is subjected to heat in an ordinary drier, such as the type used for the desiccating of vegetables, at a temperature and for a period sufficient to reduce the moisture content to a point inhibiting decomposition, for example, about twelve percent, which may be accomplished, due to the prior expression of moisture, without material changes in composition, such as ordinarily result from excessive heating. The resultant product is of sufficient dryness to possess permanent keeping qualities and may be stored or shipped without likelihood of deterioration. It is of good color, odor and taste, and in a condition which makes it an attractive dry feed for cattle. The same approximate result, as to dryness, may be obtained by exposing the harvested plants to the sun in shallow piles during the warm season. However, that is a slow method, and it does not retain some of the desirable qualities of color and taste which characterize the product prepared as above described. When it is to be incorporated in mixed feeds, the dry product thus obtained may be still further reduced by chopping or grinding.

A particular object of the product thus obtained, whether fed alone or admixed with other ration components, resides in its capacity for contributing the quality of succulency to the feed. Among the factors which give a feed succulency is its capacity for carrying moisture. This is of particular importance in the rationing of dairy cows in the winter time. My new article of food possesses this characteristic to a very high degree, as I find by test that it absorbs more than twice as much water as dried beet pulp, which heretofore has been recognized as one of the most generally used and most successful ingredients for introducing succulency into the ration. Because of the customary shortage of dried beet pulp, and the scarcity of other suitable commodities having this desirable characteristic, my new product is of particular importance from the economic standpoint. Moreover, from the physiological standpoint it is of particular importance because of its very substantial food value in combination with its succulent quality. Heretofore certain absorptives have been used which are practically devoid of nutritive value, such as peat and moss. Analysis of my new product has found the following composition:

|  | Leaves | Roots | Stems | Entire plant |
|---|---|---|---|---|
|  | Per cent | Per cent | Per cent | Per cent |
| Moisture | 3.6 | 3.4 | 5.55 | 4.31 |
| Crude protein (Nx 6.25) | 20.3 | 6.9 | 13.3 | 12.82 |
| Crude fat | 2.15 | 1.2 | 1.6 | 1.60 |
| Ash | 19.9 | 33.1 | 15.0 | 22.57 |
| Crude fibre | 18.6 | 20.4 | 24.4 | 21.55 |
| Nitrogen free extract | 35.45 | 35.0 | 40.15 | 37.15 |

Analysis of ash

| | Per cent |
|---|---|
| Total silica calculated as silicon dioxide | 22.97 |
| Total iron and aluminum calculated as iron and aluminum oxides | 16.00 |
| Total calcium calculated as calcium oxide | 32.25 |
| Total phosphorous calculated as phosphorous pentoxide | 7.41 |
| Total magnesium calculated as magnesium oxide | 6.97 |
| Total chloride calculated as sodium chloride | 6.90 |

My new product is of particular utility as an ingredient in mixed feeds in which molasses is used, because of its peculiar capacity for imbibing and retaining material of that constituency. As a result of the use of my product in that kind of feed, the mixture retains a desirable lightness and crispness, and will not compact or become sticky, as sometimes results from the molasses partially exuding from the fibrous material. By the use of proper proportions of my product therefore, larger proportions of molasses may be incorporated in the feed.

Another quality which is of particular value in the preparation of mixed feeds is the possibility of incorporating, by the use of my product, a desired quantity of lime in an attractive and easily assimilated food form. The importance of lime, particularly in feed for growing animals, is universally recognized, and heretofore attempts have been made to supply the deficiency of that ingredient in prepared feeds by its addition in concentrated form, such as ground limestone, bone meal, or phosphate rock. The use of my new product in the feed supplies this element in a form which is much more attractive to the animal. The value of my product in this particular may be appreciated by comparison with the leguminous products suitable for use in feeds and recognized as being most rich in that element.

| | Lime—pounds per 1,000. |
|---|---|
| Red clover hay | 16.0 |
| Soy bean hay | 17.2 |
| Alfalfa hay | 19.5 |
| Cow pea hay | 25.4 |
| Water hyacinth feed | 63.0 |

In the foregoing table the figures for the legumes were taken from the standard work Feeds and Feeding by Henry and Morrison, and the figure for water hyacinth feed has been determined by my own tests. It will be appreciated, from this comparison, how the desired proportion of lime content in a feed may be obtained by the incorporation of a relatively small percentage of my new product. A properly balanced ration, in which the various advantages of my new product may be availed of, may be made by admixture of proper proportions of cotton seed meal, molasses, bran, hominy feed and my water hyacinth feed. Because of its unusual combination of absorptive capacity, lime content, and nutritious value, it will be recognized that my new product possesses great utility as an animal feed and as an ingredient of mixed feeds, while the extensiveness of the source of supply of the raw material, and the simplicity of the process whereby the product may be manufactured therefrom, assure its availability at low cost.

I claim:

1. A process of producing an alimentary product, which comprises subjecting water hyacinth plants to compression sufficient to express water, then further reducing their moisture content to a proportion inadequate for decomposition, and finally comminuting them.

2. A process of producing an alimentary product, which comprises subjecting water hyacinth plants to a mascerating operation, to liberate water from their structure, reducing the moisture content by evaporation to a proportion inadequate for decomposition, and finally comminuting the material.

3. A process of producing a new alimentary product, which comprises crushing water hyacinth plants to liberate water contained in their structure, and then, by evaporation, reducing the moisture content to a proportion inadequate for decomposition.

4. A process of producing an alimentary product which comprises first reducing the moisture content of water hyacinth plants by pressure, then reducing their moisture content by heat to a proportion inadequate for decomposition, without material alteration of their composition.

5. As an article of manufacture, an alimentary product comprising water hyacinth plants in compacted and desiccated form.

6. As an article of manufacture, an alimentary material comprising desiccated water hyacinth plants in compacted and comminuted form.

7. As an article of manufacture, an alimentary material comprising water hyacinth plants in desiccated and comminuted form.

8. As a new article of manufacture, an alimentary material comprising water hyacinth plants in desiccated form.

9. As an article of manufacture, an alimentary product comprising dried and comminuted portions of water hyacinth plants containing molasses.

In testimony whereof I have hereunto signed my name.

JESSE H. LEFTWICH.